United States Patent
Grois et al.

(10) Patent No.: US 12,425,615 B2
(45) Date of Patent: Sep. 23, 2025

(54) METHODS, SYSTEMS, AND APPARATUSES FOR CONTENT-ADAPTIVE MULTI-LAYER CODING BASED ON NEURAL NETWORKS

(71) Applicant: Comcast Cable Communications, LLC, Philadelphia, PA (US)

(72) Inventors: Dan Grois, Beer-Sheva (IL); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 504 days.

(21) Appl. No.: 17/497,588

(22) Filed: Oct. 8, 2021

(65) Prior Publication Data

US 2023/0114562 A1    Apr. 13, 2023

(51) Int. Cl.
*H04N 19/30* (2014.01)
*G06T 3/4046* (2024.01)
*G06T 9/00* (2006.01)

(52) U.S. Cl.
CPC ........... *H04N 19/30* (2014.11); *G06T 3/4046* (2013.01); *G06T 9/002* (2013.01)

(58) Field of Classification Search
CPC ........ H04N 19/30; H04N 19/33; H04N 19/80; H04N 19/46; G06T 3/4046; G06T 9/002
See application file for complete search history.

(56) References Cited

U.S. PATENT DOCUMENTS

| | | | |
|---|---|---|---|
| 2020/0126187 A1 | 4/2020 | Park et al. | |
| 2022/0210213 A1* | 6/2022 | Petrovic | H04N 21/2402 |
| 2022/0385911 A1* | 12/2022 | Ferrara | H04N 19/117 |

FOREIGN PATENT DOCUMENTS

WO    2021/064413 A1    4/2021

OTHER PUBLICATIONS

MPEG-5 part 2, Meardi et al, 2020; https://www.spiedigitallibrary.org/conference-proceedings-of-spie/11510/2569246/MPEG-5-part-2--Low-Complexity-Enhancement-Video-Coding/10.1117/12.2569246.full?SSO=1 (Year: 2020).*
MPEG-5 part 2 (Year: 2020).*
Meardi et al., "MPEG-5 part 2: Low Complexity Enhancement Video Coding (LCEVC): Overview and performance evaluation", SPIE, vol. 11510, 2020, pp. 20.

* cited by examiner

*Primary Examiner* — Jianxun Yang
(74) *Attorney, Agent, or Firm* — BakerHostetler

(57) ABSTRACT

Methods, systems, and apparatuses are described for encoding video. Video content to be encoded and sent to a computing device may be downscaled into one or more layers. The one or more layers may represent one or more versions of the video content such as one or more versions encoded at different resolutions. The residuals between each layer and the base layer may be upscaled so that one or more parameters associated with optimizing the encoding of the one or more layers may be determined by one or more neural networks based on the downscaling and upscaling process. The residuals between each layer, the one or more parameters, and the base layer may be encoded and sent to a computing device for decoding and playback of the video content using any of the versions of the video content.

20 Claims, 7 Drawing Sheets

METHODS, SYSTEMS, AND APPARATUSES FOR CONTENT-ADAPTIVE MULTI-LAYER CODING BASED ON NEURAL NETWORKS

BACKGROUND

Video applications continue to gain in popularity and demand for bandwidths. A very significant increase in the bandwidth requirements is expected by 2023, particularly due to the increase in the device resolution. For example, there are some estimates that 66 percent of connected flat-panel TV sets will provide Ultra-High Definition (UltraHD) resolution compared to only 33 percent in 2018. UltraHD refers to the 3840×2160 resolution (4K) in terms of luma samples. Since a typical bit-rate for the 4K video is between 15 to 18 Mbps, it is considered to be more than twice the High-Definition (HD) video bit-rate and a factor of nine times the Standard-Definition (SD) video bit-rate. In addition, the overall IP video traffic is expected grow to 82% of all Internet traffic by 2022. Accordingly, there is a need for improved techniques that decrease video transmission bit-rate without reducing the visual presentation quality.

SUMMARY

This Summary is provided to introduce concepts that are further described herein. This Summary is not intended to be used to limit the scope of the claimed subject matter. Methods, systems, and apparatuses are described for encoding video. Video content to be encoded and sent to a computing device may be downscaled into one or more layers. The one or more layers may represent one or more versions of the video content such as one or more versions encoded at different resolutions. The residuals between each layer and the base layer may be upscaled so that one or more parameters associated with optimizing the encoding of the one or more layers may be determined by one or more neural networks based on the downscaling and upscaling process. The residuals between each layer, the one or more parameters, and the base layer may be encoded and sent to a computing device for decoding and playback of the video content using any of the versions of the video content.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
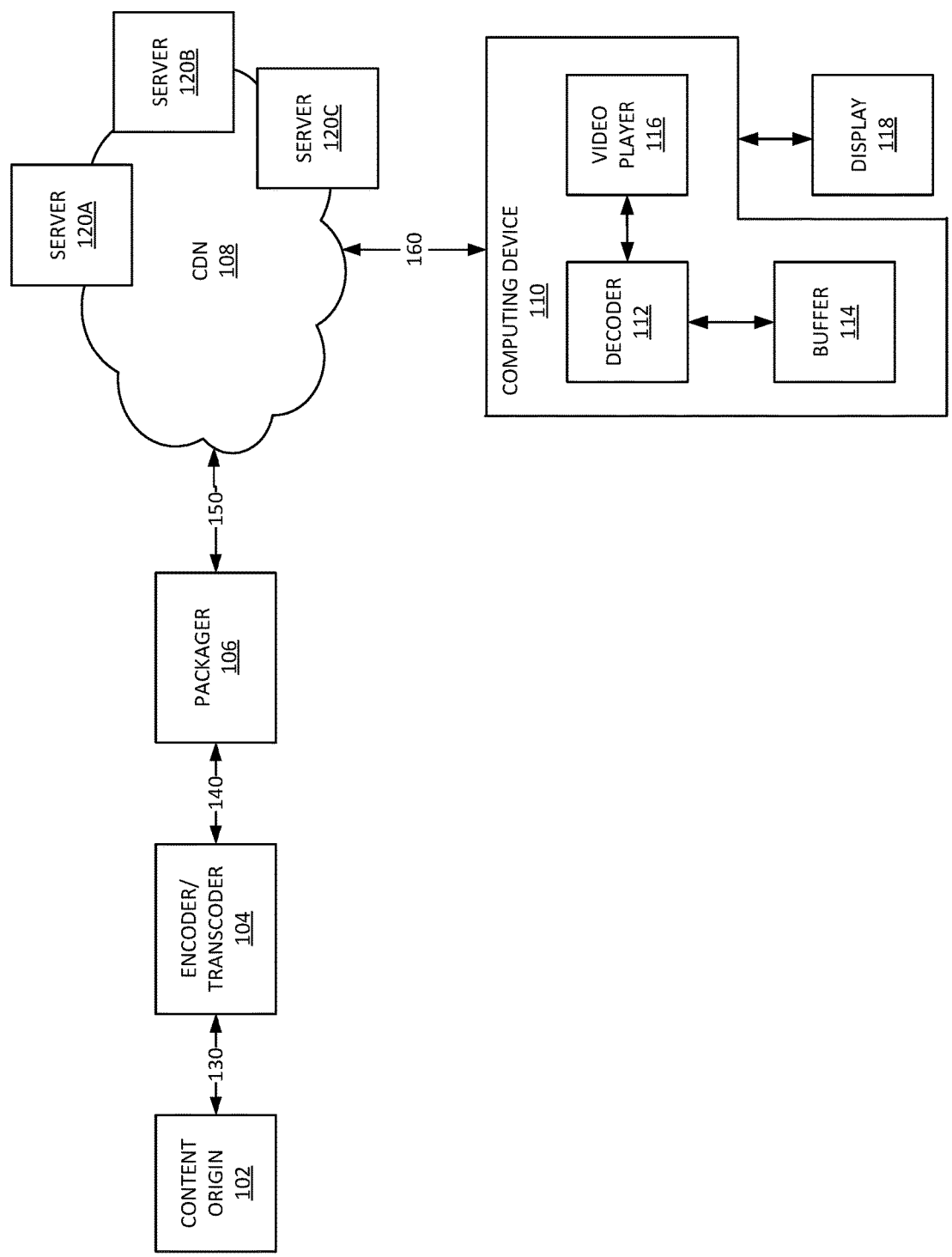
FIG. 1 shows an example system.

Methods and systems are described for encoding video. As used herein, the terms downscaling and downsampling may be used interchangeably. As used herein, the terms upscaling and upsampling may be used interchangeably. There is a plurality of video codecs available on the market, such as MPEG-2, H.264/MPEG-AVC, H.265/MPEG-HEVC (High Efficiency Video Coding), H.266/MPEG-VVC (Versatile Video Coding), MPEG-5 EVC (Essential Video Coding), VP9, AV1, etc. Accordingly, the decision to utilize one codec or another is not straightforward.

The first version of the H.265/MPEG-HEVC standard was officially approved in 2013, thereby allowing to compress high-resolution video content, such as 3840×2160 (4K) resolutions in terms of luma samples, in a much efficient manner compared to its predecessor H.264/MPEG-AVC. As a result, this allowed providing a good trade-off between the content visual quality and its corresponding bitrate. In turn, the development of the next generation video coding standard, referred to as the VVC standard that officially started in April 2018, and the work on its first edition was accomplished in July 2020. The VVC standard has been developed with UltraHD and high frame rate (HFR) requirements in mind, such as 7680×4320 (8K) and 60 Hz-120 Hz, respectively. However, the average computational complexity of VVC is approximately 10 times higher than of its predecessor, HEVC.

Generally, there are other alternatives to VVC, such as EVC. The development of EVC was started by the Moving Picture Experts Group (MPEG) organization in 2018 and was standardized in 2020 as MPEG-5 Part 1. EVC has two coding profiles: one is a baseline profile that contains a set of tools that are considered to be in the public domain (e.g., tools that have been published more than 20 years ago, or otherwise, are expected to be "royalty-free"); and another is a main profile, that contains advanced tools on top of the baseline profile, thereby allowing the achievement of a significant coding gain over HEVC. The coding performance of EVC is worse than that of VVC, but it is achieved with some reduction in the computational complexity when compared to VVC.

Further, there has been dramatic progress in the artificial intelligence/neural networks field, and particularly in the field of machine learning, deep learning, reinforcement learning, generative adversarial networks (GANs) or graph neural networks (GNNs). One of the reasons for that is an availability of powerful processing resources, such as Graphics Processing Units (GPUs). Moreover, GPU costs have been decreasing, and many computing devices (such as smartphones, tablets, or laptop) incorporate at least one GPU to significantly enhance its processing power.

As aforementioned, there is currently a need to further reduce a bitrate, especially for the 4K and 8K video content, without decreasing perceived video content quality, and further keeping computational complexity at a reasonable level. In addition, due to the variety of existing video codecs, there is a need to provide an efficient content-adaptive codec agnostic video coding framework, thereby easing a transition from one video codec to another and enabling to employ any existing video codec, such as AVC, HEVC, VVC, EVC (Essential Video Coding), VP9, AV1, etc. The embodiments described herein resolve these issues by efficiently employing neural networks.

FIG. 1 shows an example system 100. The system 100 may comprise a content origin 102, encoder/transcoder 104, packager 106, a content delivery network (CDN) 108, and a computing device 110. The techniques for video processing described herein are applicable to any delivery method including but not limited to Dynamic Adaptive Streaming over HTTP (DASH), HTTP Live Streaming (HLS), the QAM digital television standard, and adaptive bitrate (ABR) streaming.

The computing device 110 may comprise a television, a monitor, a laptop, a desktop computer, a smartphone, a set-top box, a cable modem, a gateway, a tablet, a wearable computing device, a mobile computing device, any computing device configured to receive and/or render content, the like, and/or any combination of the foregoing. The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The decoder 112 may decompress/decode encoded video data. The encoded video data may be received from the encoder/transcoder 104, the packager 106, or the CDN 108.

The content origin 102 may comprise a source feed of content from a provider. For example, the content origin 102 may comprise a broadcast source, a headend, a video on-demand server, a cable modem termination system, the like, and/or any combination of the foregoing. The content origin 102 may send content 130 to the encoder/transcoder 104. The content 130 may comprise video frames or other images. For example, the content 130 may comprise video frames in a MPEG Single Program Transport Stream (MPEG-SPTS). Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The content origin 102 may receive requests for the content 130 from the encoder/transcoder 104, the packager 106, the computing device 110, or the CDN 108.

The content origin 102 may send content 130 to the encoder/transcoder 104 based on a request for video from the encoder/transcoder 104, the packager 106, the computing device 110, or the CDN 108. The content 130 may comprise uncompressed video data or a content stream such as an MPEG-SPTS. The encoder/transcoder 104 may transcode the content 130 into one or more output streams 140. The one or more output streams 140 may comprise video encoded with a different resolution and/or a different bitrate. The one or more output streams 140 may comprise a presentation timestamp (PTS) to synchronize the content. The one or more output streams 140 may comprise one or more Instantaneous Decoder Refresh (IDR) frames.

The encoder/transcoder 104 may comprise an encoder, which may encode uncompressed video data received from the content origin 102. When uncompressed video data is received, the encoder may encode the video (e.g., into a compressed format) using a compression technique prior to transmission. The content origin 102 and the encoder/transcoder 104 may be co-located at a premises, located at separate premises, or associated with separate instances in the cloud.

The packager 106 may receive the one or more output streams 140 from the encoder/transcoder 104. The packager 106 may generate one or more ABR streams 150 in different ABR streaming formats. The one or more ABR streams 150 may be referred to as an ABR ladder, which comprises a list of the encoded one or more ABR streams 150 at the different bitrates enabling the computing device 110 to play video to match the network conditions (e.g., available bandwidth, quality of service (QoS), latency, packet loss ratio, rebuffering time, or quality of experience (QoE)).

The one or more ABR streams 150 may comprise segments or fragments of video and a manifest. The manifest may indicate availability of the ABR stream and segments/fragments and information for requesting the segments/fragments (e.g., via a Uniform Resource Locator (URL)). The packager 106 may send the one or more ABR streams 150 to the CDN 108.

The CDN 108 may comprise one or more computing devices such as servers 120A, 120B, 120C that store the one or more ABR streams 150. The CDN 108 may receive a request for content from the computing device 110. The request may be sent via a transfer protocol such as a transfer protocol used for over-the-top (OTT) playout applications. For example, this protocol may be HTTP as used in the examples described herein. However, any other transfer protocol may be used. The CDN 108 may authorize/authenticate the request and/or the computing device 110 from which the request originated. The request for content may comprise a request for a channel, a video on-demand asset, a website address, a video asset associated with a streaming service, the like, and/or any combination of the foregoing. The CDN 108 may send the request to the content origin 102, the encoder/transcoder 104, or the packager 106. The CDN 108 may send the requested content 160 to the computing device 110. The one or more servers 120A, 120B, 120C of the CDN 108 may serve the content 160 to the computing device 110.

Figure 2:
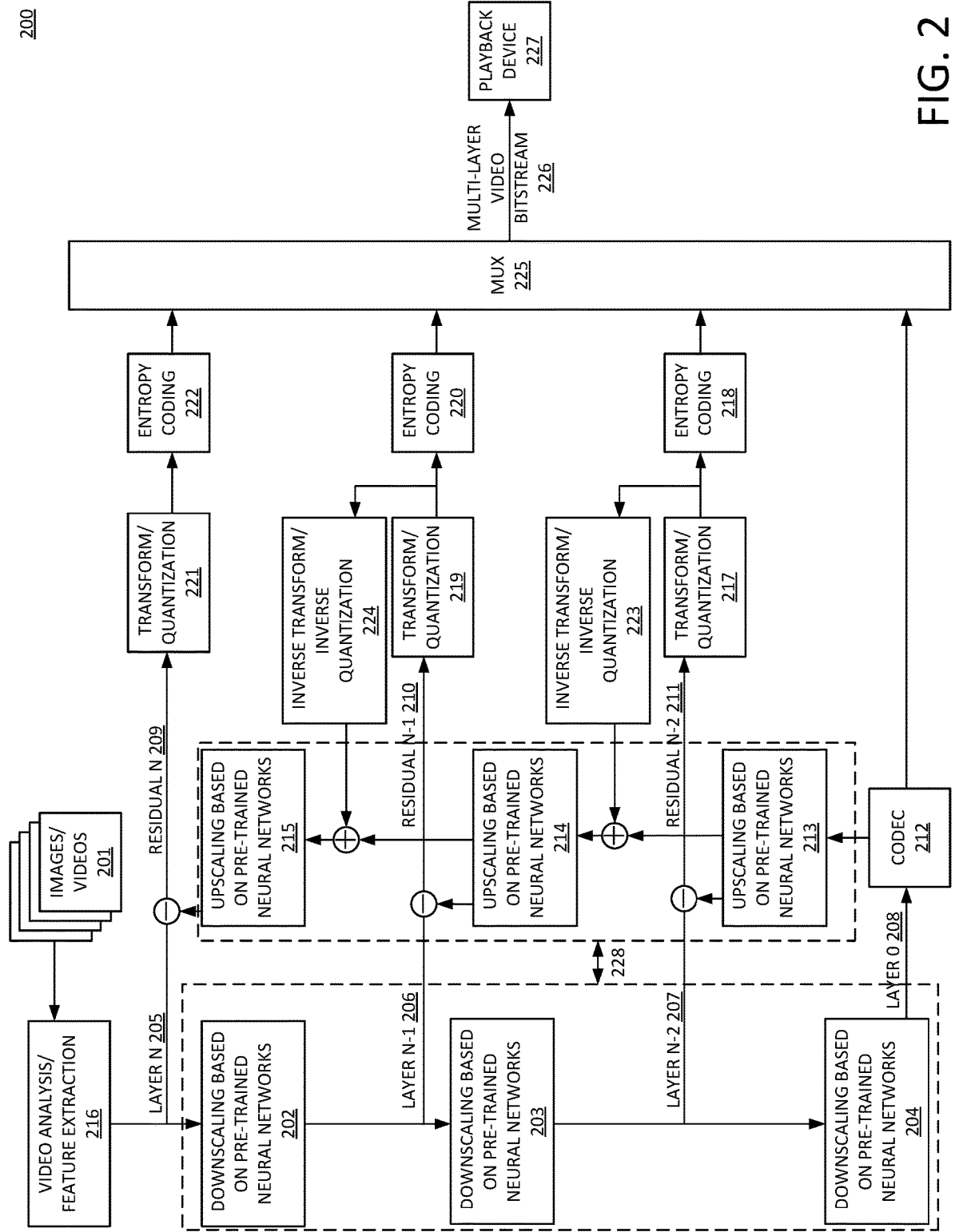
FIG. 2 shows an example system.

FIG. 2 shows an example system 200. In the example of FIG. 2, content-adaptive downsampling/downscaling of input video content 201 may be based on deep neural networks (DNNs), reinforcement neural networks (where two agents compete each other for achieving a better solution), convolutional neural networks (CNNs), graph neural networks (GNNs), etc. and/or based on machine learning methods, such as autoregression, classification, supervised/unsupervised learning, support vector machines (SVMs), random forest, etc. The neural networks may be pre-trained on a plurality of video sequences, including uncompressed videos, compressed videos, low-quality/high-quality videos, low-resolution/high-resolution videos, low frame rate/high frame rate videos, videos with coding/network artifacts, videos encoded/decoded by means of conventional codecs, such as H.264/MPEG-AVC, H.265/MPEG-HEVC, MPEG-5 EVC, H.266/MPEG-VVC, AV1, VP9, etc. Further, the neural networks may be pre-trained on different video content types, such as sport, comedy, drama, news, etc.

The video content 201 may comprise, for example, any type of video content including but not limited to high dynamic range (HDR) and standard dynamic range (SDR) video content, while the demand to preserve fine details and colors is higher in HDR. The video content 201 may be downscaled/downsampled in a content-adaptive manner (i.e. with a different scaling factor depending on a content type, such as sport, news, action, and any other type of content) by employing one or more pre-trained neural networks 202, 203, 204 to output one or more enhancement layers associated with one or more residual signals. For example, FIG. 2 shows content downscaling based on pre-trained neural networks 202, 203, 204 to output layer N 205, layer N-1 206, layer N-2 207, and layer 0 208. Layer N 205 is associated with residual signal N 209, layer N-1 206 is associated with residual signal N-1 210, and layer N-2 207 is associated with residual signal N-2 211. The base layer (layer 0) 208 may be encoded by a video codec 212. The video codec 212 may comprise, for example, a codec complying with any of AVC, HEVC, VVC, EVC, VP9, AV1, etc. The residual signal N-2 211, residual signal N-1 210, and residual signal N 209 and the parameters determined during downscaling (e.g., the weights and offsets of downscaling kernels) may be encoded following their respective transformation/quantization 217, 219, 221 and entropy encoding 218, 220, 222.

The encoded base layer (layer 0) may be reconstructed/encoded prior to being upscaled/upsampled to reproduce the one or more enhancement layers of the video content 201. For example, FIG. 2 shows content upscaling based on pre-trained neural networks 213, 214, 215 to reproduce layer N-2 207, layer N-1 206, layer N 205, and the respective residual signal N-2 211, residual signal N-1 210, and residual signal N 209. The residual signal N-2 211, residual signal N-1 210, and residual signal N 209 and the parameters determined during downscaling (e.g., the weights and offsets of downscaling kernels) may be upscaled following their respective inverse transformation/quantization 223, 224 to determine upscaling parameters (e.g., the weights and offsets of upscaling content-adaptive kernels). The parameters may also comprise syntax elements (e.g., high-level syntax elements), headers, supplemental enhancement information (SEI), and/or video usability information (VUI).

The downscaling neural networks 202, 203, 204 may be pretrained in an unsupervised manner to minimize the residual signals of each layer and/or any subsequent layer, e.g., layer 0 208, layer N 205, layer N-1 206, and layer N-2 207. The downscaling neural networks 202, 203, 204 may be pre-trained to provide an optimized visual quality of the layer 0 208 video in terms of PSNR, MS-SSIM, VMAF, of any other objective or subjective metric(s). The downscaling neural networks 202, 203, 204 may be pre-trained to optimize a quality of experience (QoE) and/or quality of service (QoS) over a wired/wireless data network and to minimize packet loss based on predefined (or real-time) network conditions (e.g., available bandwidth, network latency, etc.).

In some embodiments, prior to downsampling, the video content 201 may be analyzed by the video analysis/feature extraction unit 216 to determine any information which may improve the downscaling/upscaling process to keep visual quality at an optimal level, such as video content type, video objective/subjective quality, resolution, frame rate. In addition, for example, the following features are extracted and analyzed: video content temporal and spatial information, edges, corners, textures, pixel luma and chroma values, region of interests, motion/optical flow information, backgrounds, foregrounds, patterns, spatial low/high frequencies, and many others.

During the unsupervised training, the neural networks output a reconstruction of each original frame from its downscaled version with minimal error. The content-adaptive downscaling and its corresponding content adaptive upscaling may be performed such that the residual signals (the reconstruction errors) of each layer (residual signal N-2 211, residual signal N-1 210, and residual signal N 209) are minimized to increase an overall coding gain. The downscaling may be performed in an unsupervised manner using pre-trained neural networks (e.g., convolutional neural networks (CNNs)), while parameters determined during downscaling and upscaling (e.g., the weights and offsets of downscaling and upscaling content-adaptive kernels) may be determined according to a content type and/or characteristics of the video content 201 to be encoded. The parameters determined during downscaling and upscaling (e.g., the weights and offsets of downscaling and upscaling content-adaptive kernels) may be exchanged in real-time or offline 228. This exchange 228 enables the training process for the downscaling neural networks and the upscaling neural networks to be done together. The parameters determined during downscaling and upscaling (e.g., the weights and offsets of downscaling and upscaling content-adaptive kernels) may be based on the analysis of features extracted from the video content 201. The features extracted from the video content 201 may be extracted from a video analysis/feature extraction unit 216.

The downscaling and upscaling kernels may comprise one or more matrices indicating the weights and offsets. The downscaling and upscaling kernels may be generated and optimized for each pixel of each frame of the input video content 201. During the downscaling and upscaling, different weights may be assigned to different pixels of each frame in order to minimize a residual of each layer, such that the downscaling and upscaling is conducted in a non-uniform manner, while kernel offsets can differ both by directions and magnitudes. For example, the video content 201 may be downscaled and upscaled in an optimal manner considering the video content 201 structure and its specific features, thereby leading to significant coding gains while keeping the visual presentation quality at optimal levels.

The encoded base layer (layer 0), downscaling parameters (e.g., the weights and offsets of downscaling kernels) and upscaling parameters (e.g., the weights and offsets of upscaling content-adaptive kernels) may be multiplexed 225 into a multilayer video bitstream 226 that is sent to a playback device 227 for decoding and playback. For example, the multiplexed bitstream may be sent to a computing device to cause decoding and playback of the video content.

Figure 3:
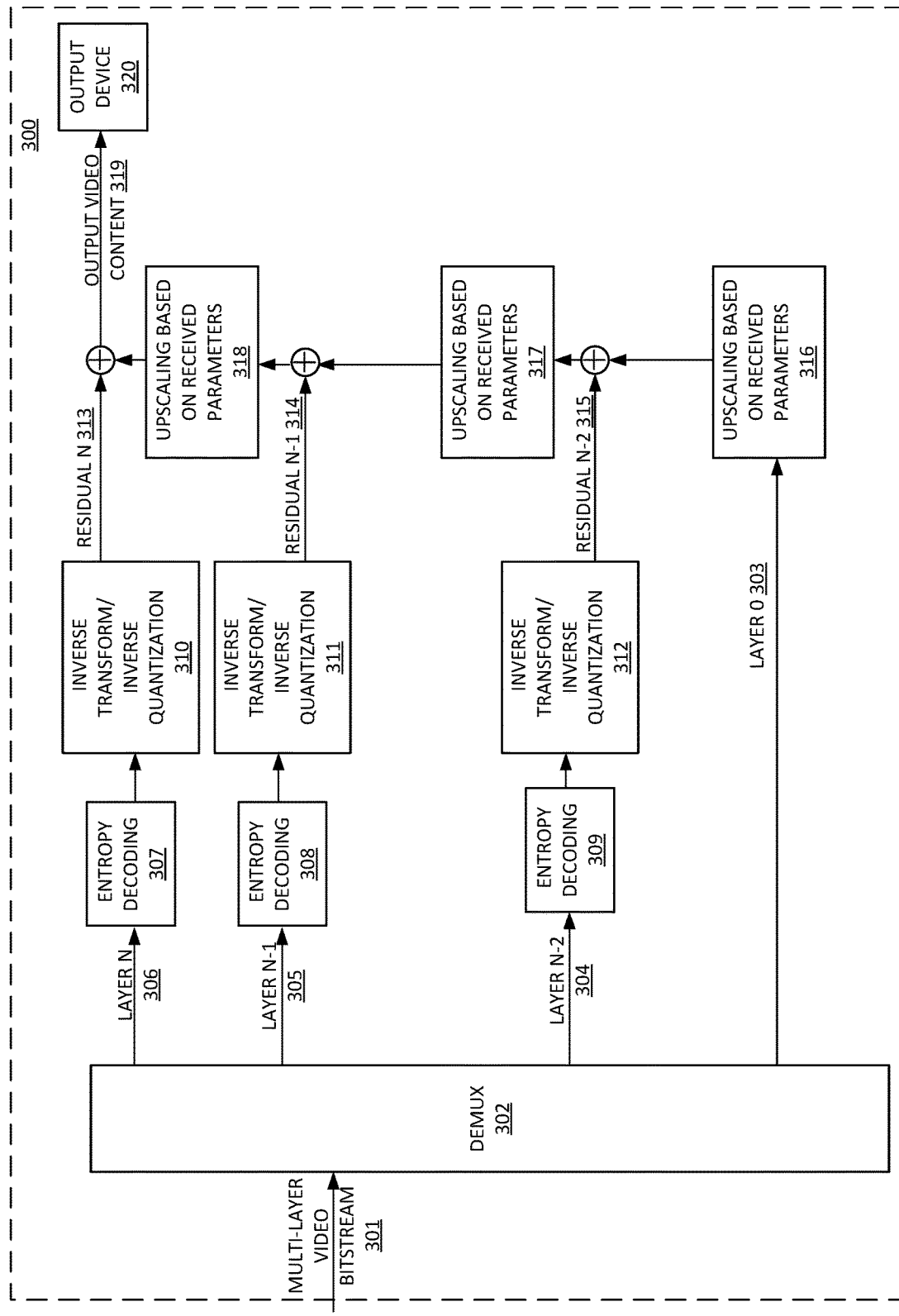
FIG. 3 shows an example playback device.

FIG. 3 shows an example playback device 300. The playback device 300 may comprise a television, a monitor, a laptop, a desktop computer, a smartphone, a set-top box, a cable modem, a gateway, a tablet, a wearable computing device, a mobile computing device, any computing device configured to receive and/or render content, the like, and/or any combination of the foregoing. The playback device 300 may receive a multilayer video bitstream 301. A demultiplexer 302 may output one or more enhancement layers of video content. The number of enhancement layers may depend on the capabilities of the playback device and the available resources such as computational resources, battery power, or network bandwidth. For example, the demultiplexer 302 may output layer 0 303, layer N-2 304, layer N-1 305, and layer N 306. The one or more layers of video content may undergo entropy decoding. For example, layer N 306, layer N-1 305, and layer N-2 304 may undergo their respective entropy decoding 307, 308, and 309. The one or more layers of video content may undergo inverse transformation and inverse quantization to output a residual signal. For example, inverse transformation and inverse quantization 310 may output residual N 313, inverse transformation and inverse quantization 311 may output residual N-1 314, inverse transformation and inverse quantization 312 may output residual N-2 315. Layer 0 303 may be upscaled 316 and added to residual layer N-2 315, which may be upscaled 317 and added to residual layer N-1 314, which may be upscaled 318 and added to residual layer N 313 to output video content 319. The upscaling 316, 317, and 318 may be based on one or more parameters received in the multilayer video bitstream 301. The one or more parameters may comprise, for example, the parameters described above with respect to FIG. 2. The output video content 319 may be output by an output device 320 (e.g., a display or television).

Figure 4:
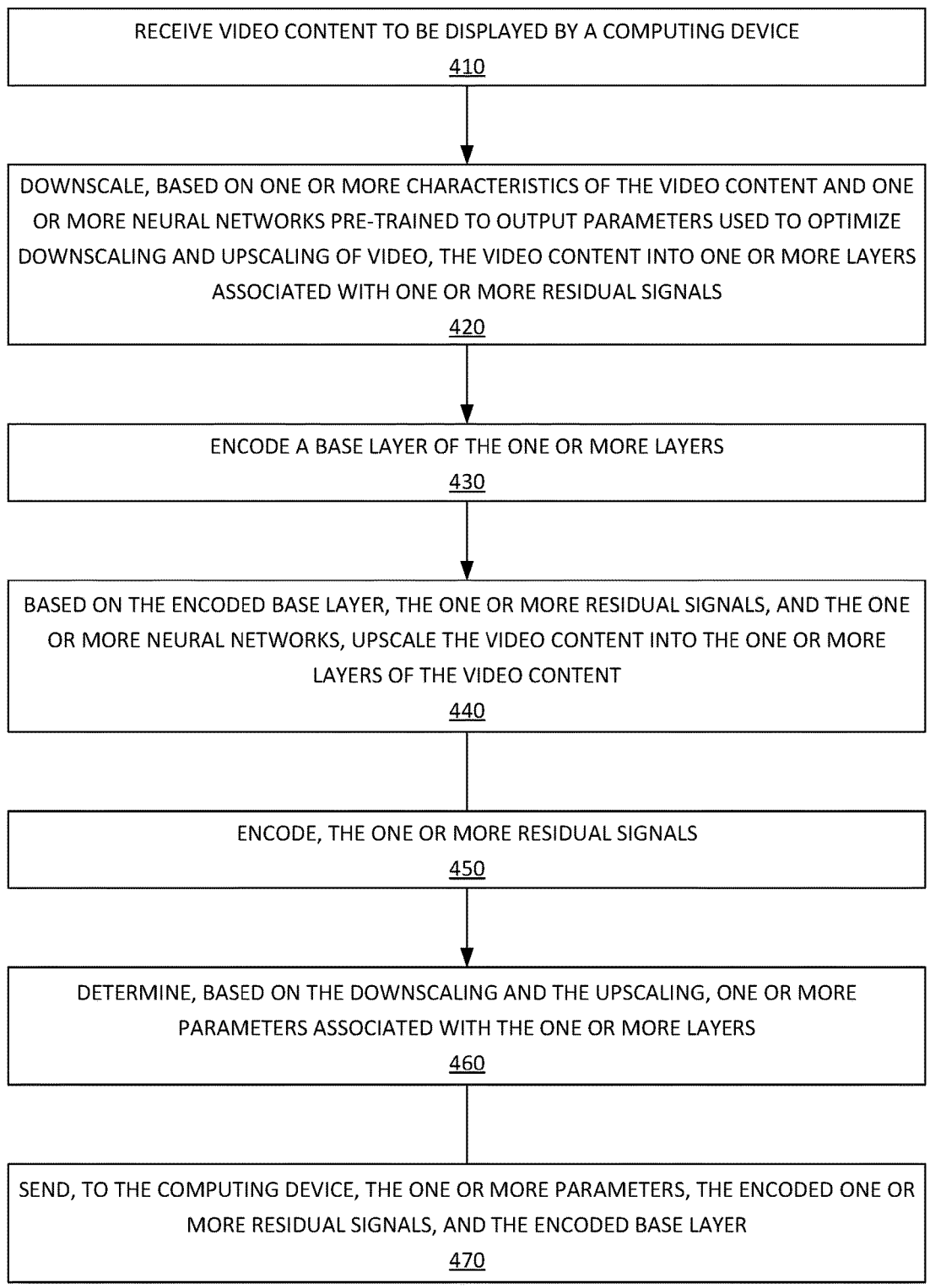
FIG. 4 shows an example method.

FIG. 4 shows an example method 400. The method 400 of FIG. 4, may be performed by any device, for example, by any of the devices depicted in FIGS. 1-2 or described herein. While each step in the method 400 of FIG. 4 is shown and described separately, multiple steps may be executed in a different order than what is shown, in parallel with each other, or concurrently with each other. At step 410, video content to be displayed by a computing device may be received. At step 420, the video content may be downscaled into one or more layers associated with one or more residual signals. The one or more layers may comprise enhancement layers of the video content. The downscaling may be based on one or more characteristics of the video content and one or more neural networks pre-trained to output parameters used to optimize downscaling and upscaling of video. The one or more characteristics of the video content may comprise one or more of: video content type, video objective/subjective quality, resolution, or frame rate. The one or more neural networks may be pre-trained based on at least one of: uncompressed video content, compressed video content, low-quality video content, high-quality video content, low-resolution video content, high-resolution video content, low frame rate video content, high frame rate video content, video content with coding artifacts, or video content with network artifacts.

At step 430, a base layer of the one or more layers may be encoded. At step 440, the video content may be upscaled into the one or more layers of the video content. The upscaling may be based on the encoded base layer, the one or more residual signals, and the one or more neural networks At step 450, the one or more residual signals may be encoded.

At step 460, one or more parameters associated with the one or more layers may be determined. The determining may be based on the downscaling and the upscaling. The one or more parameters and the one or more residual signals may optimize an overall coding gain of the video content. The one or more parameters may comprise one or more kernels of the one or more layers. The one or more kernels may comprise one or more matrices. The one or more parameters may comprise one or more indices indicative of one or more kernels of the one or more layers. The one or more parameters may comprise one or more weights associated with one or more kernels of the one or more layers. The one or more parameters may comprise one or more offsets associated with one or more kernels of the one or more layers. The one or more parameters may also comprise syntax elements (e.g., high-level syntax elements), headers, SEI, and/or VUI. At step 470, the one or more parameters, the encoded one or more residual signals, and the encoded base layer may be sent to the computing device.

Figure 5:
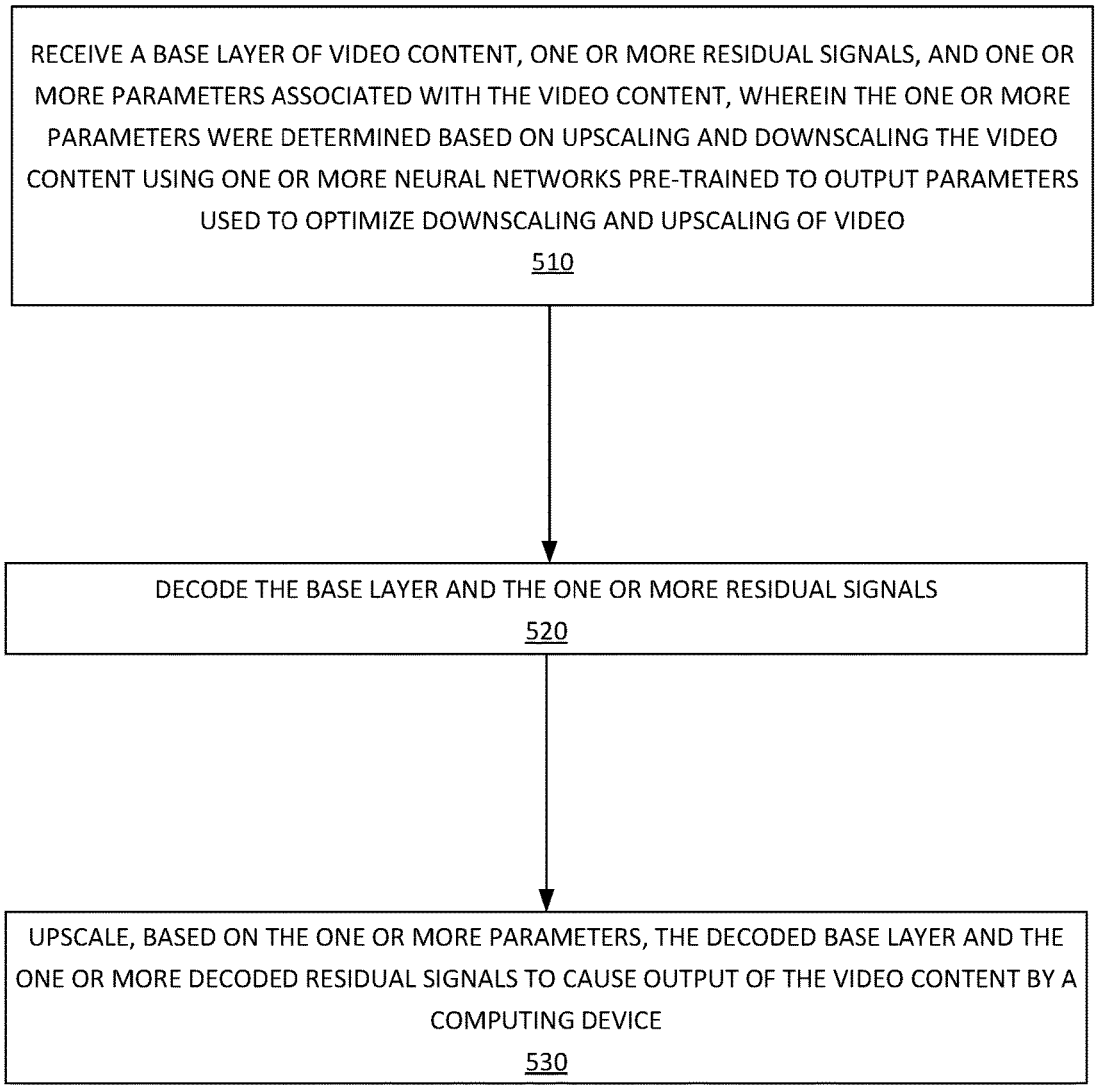
FIG. 5 shows an example method.

FIG. 5 shows an example method 500. The method 500 of FIG. 5, may be performed by any device, for example, by any of the devices depicted in FIGS. 1-2 or described herein. While each step in the method 500 of FIG. 5 is shown and described separately, multiple steps may be executed in a different order than what is shown, in parallel with each other, or concurrently with each other. At step 510, a base layer of video content, one or more residual signals, and one or more parameters associated with the video content may be received. The one or more parameters may have been determined based on upscaling and downscaling the video content using one or more neural networks pre-trained to output parameters used to optimize downscaling and upscaling of video. The one or more neural networks may be pre-trained based on at least one of: uncompressed video content, compressed video content, low-quality video content, high-quality video content, low-resolution video content, high-resolution video content, low frame rate video content, high frame rate video content, video content with coding artifacts, or video content with network artifacts.

The one or more parameters may comprise one or more kernels of the one or more layers. The one or more layers may comprise enhancement layers of the video content. The one or more kernels may comprise one or more matrices. The one or more parameters may comprise one or more indices indicative of one or more kernels of the one or more layers. The one or more parameters may comprise one or more weights associated with one or more kernels of the one or more layers. The one or more parameters may comprise one or more offsets associated with one or more kernels of the one or more layers. The one or more parameters may comprise one or more offsets associated with one or more kernels of the one or more layers. The one or more parameters may also comprise syntax elements (e.g., high-level syntax elements), headers, SEI, and/or VUI.

At step 520, the base layer and the one or more residual signals may be decoded. At step 530, the decoded base layer and the one or more decoded residual signals may be upscaled to cause output of the video content by a computing device. The upscaling may be based on based on the one or more parameters.

Figure 6:
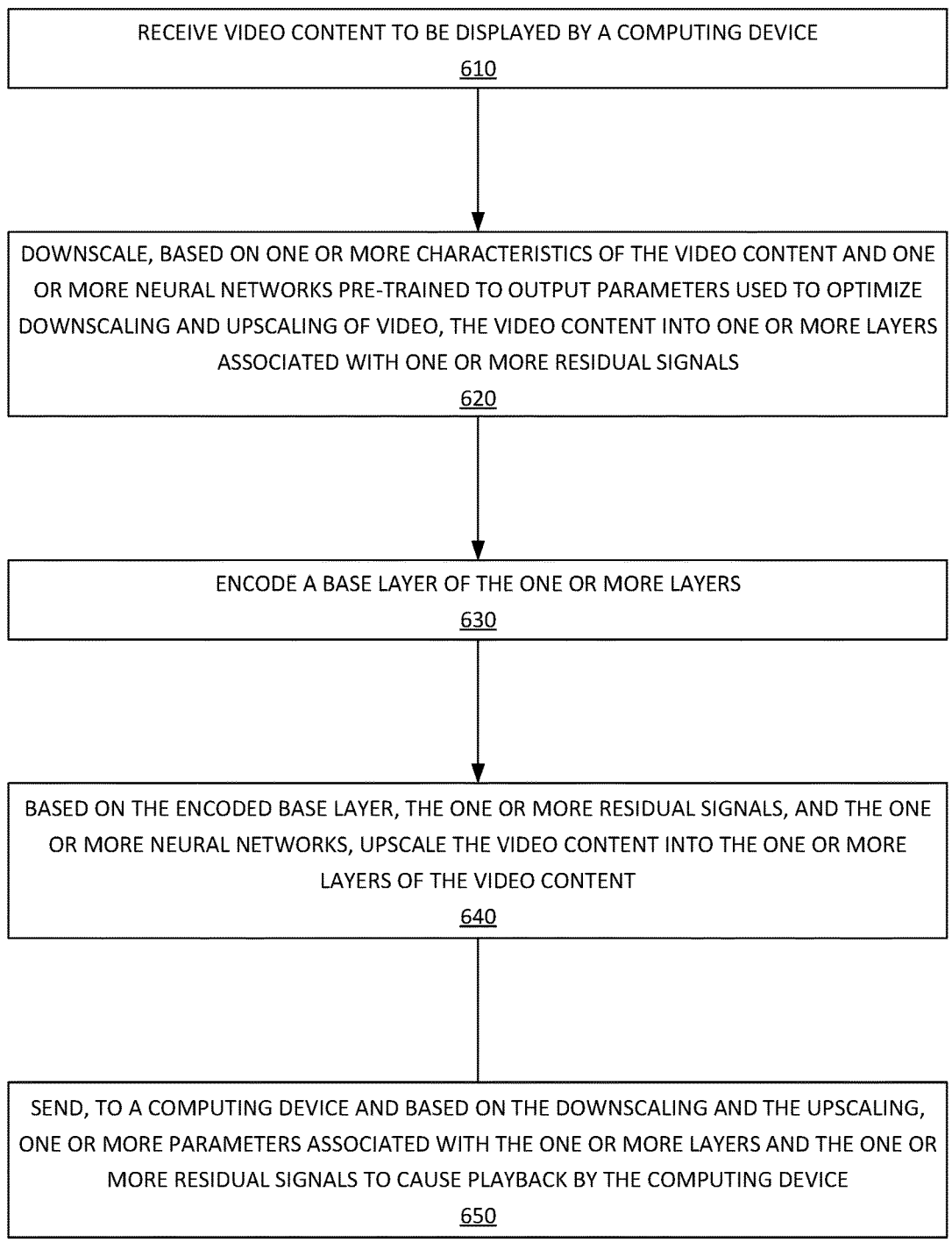
FIG. 6 shows an example method.

FIG. 6 shows an example method 600. The method 600 of FIG. 6, may be performed by any device, for example, by any of the devices depicted in FIGS. 1-2 or described herein. While each step in the method 600 of FIG. 6 is shown and described separately, multiple steps may be executed in a different order than what is shown, in parallel with each other, or concurrently with each other. At step 610, video content to be displayed by a computing device may be received. At step 620, the video content may be downscaled into one or more layers associated with one or more residual signals. The one or more layers may comprise enhancement layers of the video content. The downscaling may be based on one or more characteristics of the video content and one or more neural networks pre-trained to output parameters used to optimize downscaling and upscaling of video. The one or more characteristics of the video content may comprise one or more of: video content type, video objective/subjective quality, resolution, or frame rate. The one or more neural networks may be pre-trained based on at least one of: uncompressed video content, compressed video content, low-quality video content, high-quality video content, low-resolution video content, high-resolution video content, low frame rate video content, high frame rate video content, video content with coding artifacts, or video content with network artifacts.

At step 630, a base layer of the one or more layers may be encoded. At step 640, the video content may be upscaled into the one or more layers of the video content. The upscaling may be based on the encoded base layer, the one or more residual signals, and the one or more neural networks. At step 650, one or more parameters associated with the one or more layers and the one or more residual signals may be sent to the computing device. The one or more parameters may have been determined based on the upscaling and the downscaling. The one or more parameters associated with the one or more layers may optimize an overall coding gain of the video content. The one or more parameters may comprise one or more offsets associated with one or more kernels of the one or more layers. The one or more parameters may also comprise syntax elements (e.g., high-level syntax elements), headers, SEI, and/or VUI. The one or more parameters may comprise one or more kernels of the one or more layers. The one or more kernels may comprise one or more matrices. The one or more parameters may comprise one or more indices indicative of one or more kernels of the one or more layers. The one or more parameters may comprise one or more weights associated with one or more kernels of the one or more layers. The one or more parameters may comprise one or more offsets associated with one or more kernels of the one or more layers.

Figure 7:
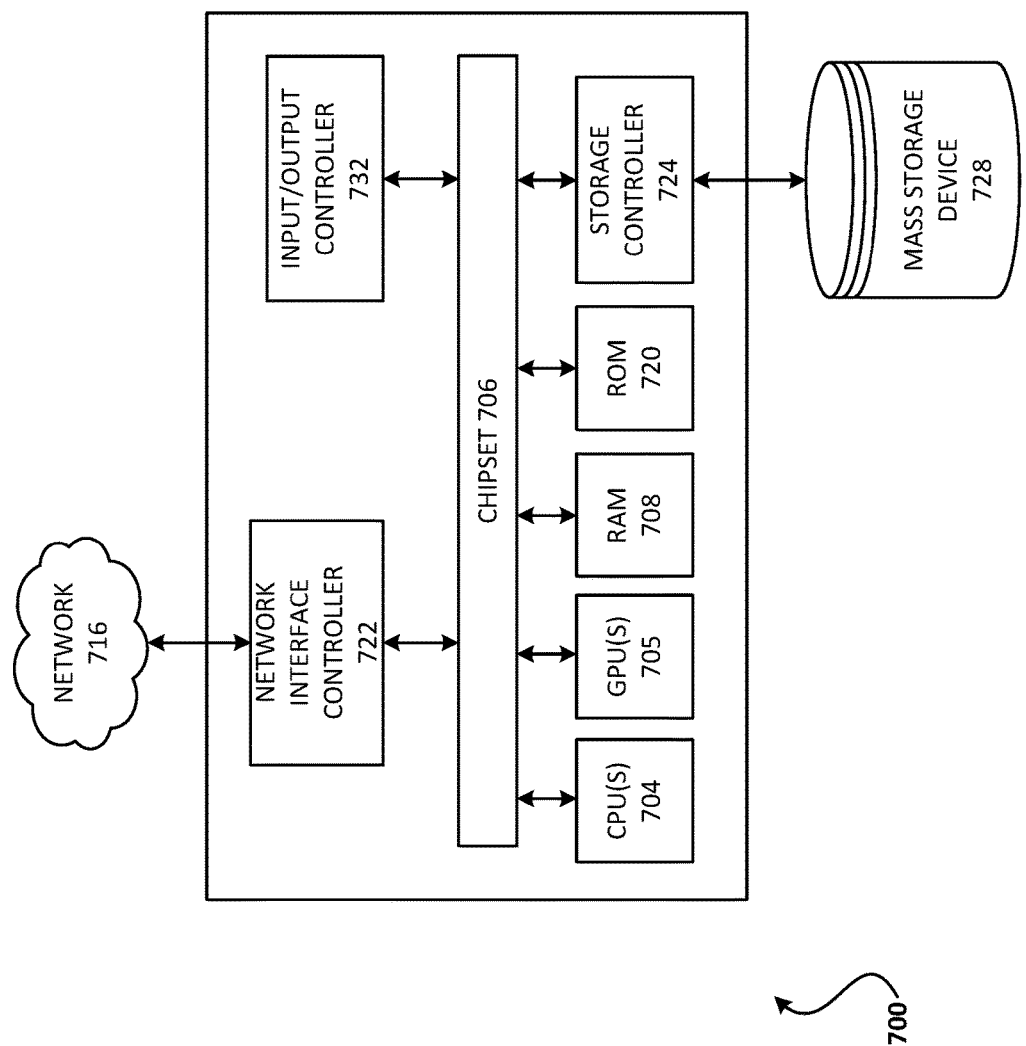
FIG. 7 shows an example computing device.

FIG. 7 depicts a computing device that may be used in various aspects, such as the servers, modules, and/or devices depicted in FIGS. 1-2. With regard to the example architecture of FIGS. 1-2, each device depicted in FIGS. 1-2 may be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-5.

The computing device 700 may comprise a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 1-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    receiving video content to be displayed by a computing device;
    based on a video content type associated with the video content and one or more neural networks pre-trained for the video content type to output parameters used to optimize downscaling and upscaling of video, downscaling the video content into one or more layers associated with one or more residual signals;
    encoding a base layer of the one or more layers;
    based on the encoded base layer, the one or more residual signals, and the one or more neural networks, upscaling the video content into the one or more layers of the video content;
    encoding the one or more residual signals;
    determining, based on the video content type and an analysis of one or more features extracted from the video content during the downscaling and the upscaling, one or more parameters associated with the one or more layers; and
    sending, to the computing device, the one or more parameters, the encoded one or more residual signals, and the encoded base layer.

2. The method of claim 1, wherein the one or more parameters and the one or more residual signals optimize an overall coding gain of the video content.

3. The method of claim 1, wherein the one or more parameters comprise at least one of:
    one or more kernels associated with the one or more layers, wherein the one or more kernels comprise one or more matrices,
    one or more indices indicative of one or more kernels associated with the one or more layers,
    one or more weights associated with one or more kernels associated with the one or more layers, or
    one or more offsets associated with one or more kernels associated with the one or more layers.

4. The method of claim 1, wherein the downscaling is further based on one or more characteristics of the video content comprising one or more of: video objective/subjective quality, resolution, or frame rate.

5. The method of claim 1, further comprising:
    extracting, from the video content, the one or more features associated with the video content, wherein the one or more features comprise at least one of: temporal and spatial information, edges, corners, textures, pixel luma and chroma values, region of interests, motion or optical flow information, backgrounds, foregrounds, patterns, or spatial low or high frequencies.

6. The method of claim 1, wherein the one or more neural networks are pre-trained based on at least one of: uncompressed video content, compressed video content, low-quality video content, high-quality video content, low-resolution video content, high-resolution video content, low frame rate video content, high frame rate video content, video content with coding artifacts, or video content with network artifacts.

7. The method of claim 1, wherein the one or more parameters indicate a weight for each pixel of each frame of the video content in order to minimize the one or more residual signals.

8. A method comprising:
receiving a base layer of video content, one or more residual signals, and one or more parameters associated with the video content, wherein the one or more parameters were determined based on a video content type associated with the video content and an analysis of one or more features extracted from the video content during upscaling and downscaling the video content, wherein the upscaling and downscaling uses one or more neural networks pre-trained for the video content type to output parameters used to optimize downscaling and upscaling of video;
decoding the base layer and the one or more residual signals; and
upscaling, based on the one or more parameters, the decoded base layer and the one or more decoded residual signals to cause output of the video content by a computing device.

9. The method of claim 8, wherein the one or more parameters and the one or more residual signals optimize an overall coding gain of the video content.

10. The method of claim 8, wherein the one or more parameters comprise at least one of:
one or more kernels associated with the one or more layers, wherein the one or more kernels comprise one or more matrices,
one or more indices indicative of one or more kernels associated with the one or more layers,
one or more weights associated with one or more kernels associated with the one or more layers, or
one or more offsets associated with one or more kernels associated with the one or more layers.

11. The method of claim 8, wherein the downscaling was based on one or more characteristics of the video content, wherein the one or more characteristics comprise one or more of: the video content type, video objective/subjective quality, resolution, or frame rate.

12. The method of claim 8, further comprising:
extracting, from the video content, the one or more features associated with the video content, wherein the one or more features comprise at least one of: temporal and spatial information, edges, corners, textures, pixel luma and chroma values, region of interests, motion or optical flow information, backgrounds, foregrounds, patterns, or spatial low or high frequencies.

13. The method of claim 8, wherein the one or more neural networks are pre-trained based on at least one of: uncompressed video content, compressed video content, low-quality video content, high-quality video content, low-resolution video content, high-resolution video content, low frame rate video content, high frame rate video content, video content with coding artifacts, or video content with network artifacts.

14. The method of claim 8, wherein the one or more parameters indicate a weight for each pixel of each frame of the video content in order to minimize the one or more residual signals.

15. A method comprising:
receiving video content to be displayed by a computing device;
based on a video content type associated with the video content and one or more neural networks pre-trained for the video content type to output parameters used to optimize downscaling and upscaling of video, downscaling the video content into one or more layers associated with one or more residual signals;
encoding a base layer of the one or more layers;
based on the encoded base layer, the one or more residual signals, and the one or more neural networks, upscaling the video content into the one or more layers of the video content; and
sending, to a computing device and based on the downscaling and the upscaling, one or more parameters associated with the one or more layers and the one or more residual signals to cause playback by the computing device, wherein the one or more parameters were determined based on the video content type and an analysis of one or more features extracted from the video content during.

16. The method of claim 15, wherein the one or more parameters and the one or more residual signals optimize an overall coding gain of the video content.

17. The method of claim 15, wherein the one or more parameters comprise at least one of:
one or more kernels associated with the one or more layers, wherein the one or more kernels comprise one or more matrices,
one or more indices indicative of one or more kernels associated with the one or more layers,
one or more weights associated with one or more kernels associated with the one or more layers, or
one or more offsets associated with one or more kernels associated with the one or more layers.

18. The method of claim 15, wherein the downscaling was based on one or more characteristics of the video content, wherein the one or more characteristics comprise one or more of: the video content type, video objective/subjective quality, resolution, or frame rate.

19. The method of claim 15, wherein the one or more neural networks are pre-trained based on at least one of: uncompressed video content, compressed video content, low-quality video content, high-quality video content, low-resolution video content, high-resolution video content, low frame rate video content, high frame rate video content, video content with coding artifacts, or video content with network artifacts.

20. The method of claim 15, wherein the one or more parameters indicate a weight for each pixel of each frame of the video content in order to minimize the one or more residual signals.

* * * * *